Figure 4:
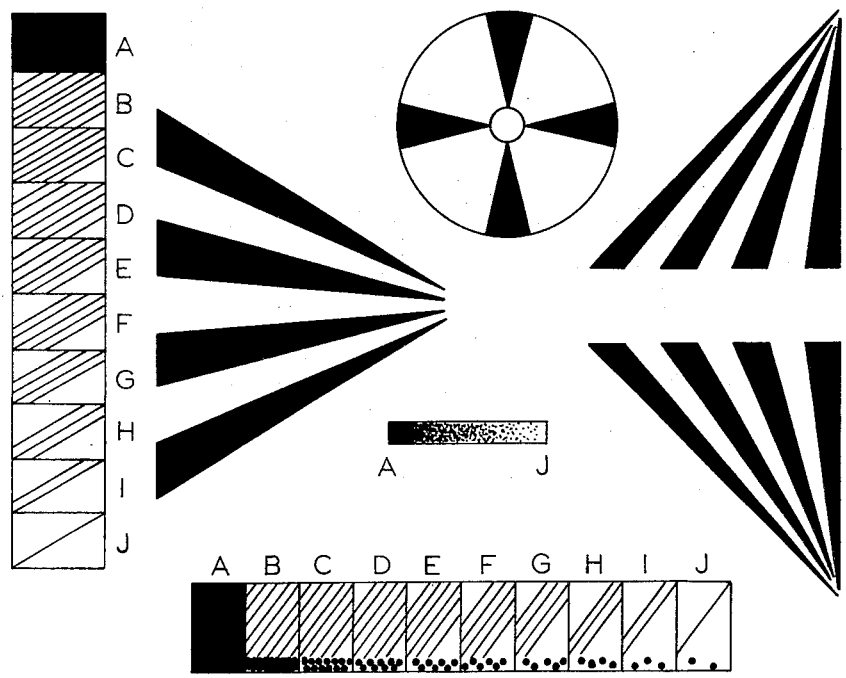

United States Patent

Crownover

[15] 3,694,654

[45] Sept. 26, 1972

[54] LONG WAVELENGTH INFRARED TEST SET

[72] Inventor: James D. Crownover, 4206 Goodfellow, Dallas, Tex. 75229

[22] Filed: May 12, 1971

[21] Appl. No.: 142,631

[52] U.S. Cl. ..........................250/83.3 H, 250/83 R
[51] Int. Cl. ...............................................G01j 1/00
[58] Field of Search ........250/83 R, 83.3 H, 83.3 HP, 250/84; 73/355 R

[56] References Cited

UNITED STATES PATENTS

| | | | |
|---|---|---|---|
| 2,456,801 | 12/1948 | Tolson | 250/83 R |
| 3,227,879 | 1/1966 | Blau et al. | 250/84 |
| 3,551,051 | 12/1970 | Salgo | 250/83 R |
| 3,596,096 | 7/1971 | Koehler | 250/83.3 H |

*Primary Examiner*—Archie R. Borchelt
*Attorney*—Warren H. Kintzinger

[57] ABSTRACT

A test set for forward looking infrared systems or cameras with test set optics projecting onto the field of view of devices being tested the infrared radiation from two plates at a controlled temperature differential subject to calibrated adjustment. A first plate of the two plates contains openings in chosen patterns through which radiations from portions of the second plate are viewed simultaneously with radiation of the first plate. This is with the two plates spaced a predetermined $\Delta T_1$ temperature distance apart in a heat flux circuit system having at least one energy exchange device and an extended $\Delta T_2$ temperature circuit path of heat flux media material with the $\Delta T_1$ temperature spacing a relatively small portion thereof.

24 Claims, 10 Drawing Figures

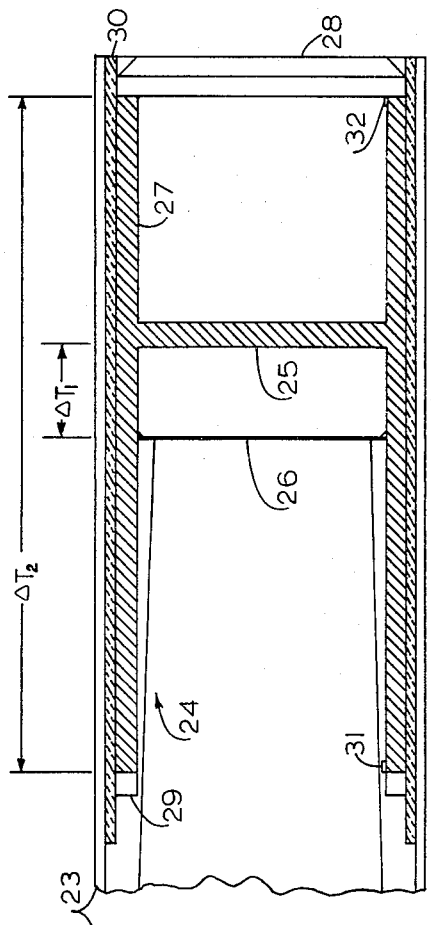
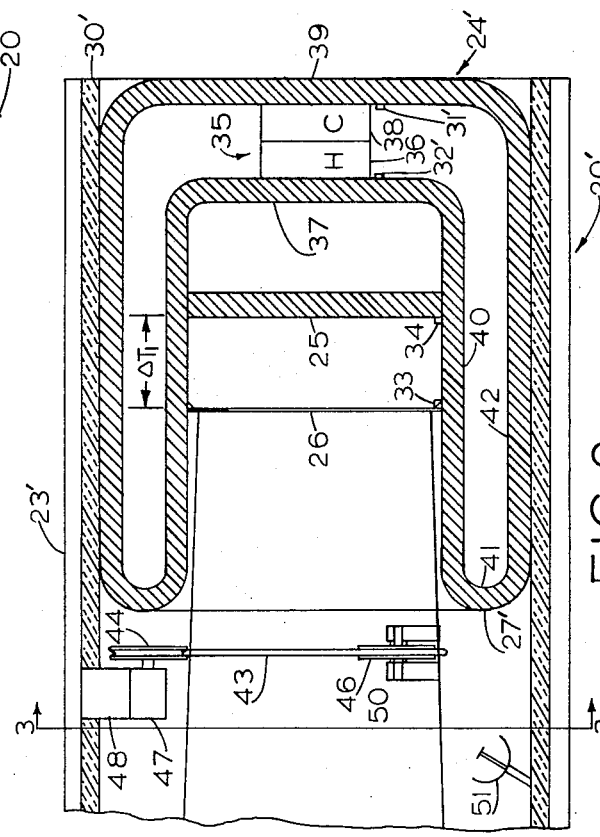
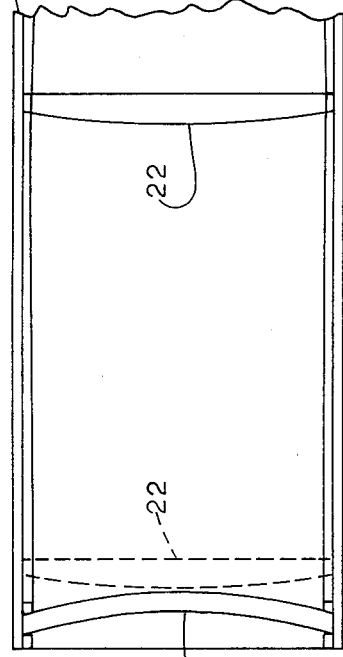
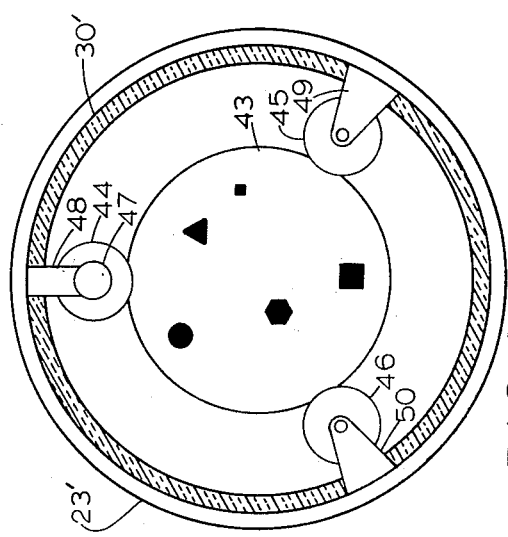
INVENTOR.
JAMES D. CROWNOVER
BY
ATTORNEY

INVENTOR.
JAMES D. CROWNOVER
BY
ATTORNEY

INVENTOR.
JAMES D. CROWNOVER
BY
Warren H. Kintzinger
ATTORNEY

LONG WAVELENGTH INFRARED TEST SET

This invention relates in general to passive long wavelength real time infrared sensing, and in particular, to long wavelength infrared test sets for field maintenance testing and laboratory testing of forward looking infrared equipment of cameras.

Infrared radiation detecting and/or measuring devices generally operate by comparing an object's infrared radiation to that of its surrounding background radiation or to that of a reference source. This may be better understood by considering the power radiation from an object as expressed in the following equation:

$$P = \epsilon \sigma T^4 / \pi \qquad (1)$$

where:
$T$ is the absolute temperature in degrees Kelvin,
$\epsilon$ is the emissivity of the surface of the plane, and
$\sigma$ is the Stefan-Boltzmann constant of $5.6697 \times 10^{-8}$ watts/$M^2 \, °K^{-4}$ This is with the video signal derived from a scene based on the difference in power being radiated from different areas of the scene. Thus, the video signal may be expressed by taking the partial derivative of equation 1 above with respect to temperature, $T$, and emissivity $\epsilon$.

$$\Delta P_T = \frac{4\epsilon \sigma T^3}{\pi} \Delta T + \frac{\sigma T^4}{\pi} \qquad (2)$$

By way of reasonable simplification for measurement purposes the emissivity of a target may be considered to be a constant equal to 1 with equation 2 then becoming:

$$\Delta P = \frac{4 \sigma T^3}{\pi} \Delta T$$

$$\text{with } \Delta T = (T_2 - T_1) \qquad (3)$$

This is a valid expression for the power change ($\Delta P$) from one object with an emissivity of 1 ($\epsilon = 1$) and a temperature $T_1$ as compared to that of a second object with an emissivity of 1($\epsilon = 1$) and a temperature of $T_2$.

With such as the preceding the capabilities of infrared radiation detection and/or measuring devices are best, and generally must be, determined by testing through sensing various combinations of known infrared radiation intensities. Generally in practice heretofore the sources of known infrared radiation intensities used in such testing and/or calibration are typically individual bodies of known radiation characteristics, i.e., emissivity factor, at known or controlled temperatures. These test sources vary from buckets of water at known temperature to carefully fabricated "black bodies" with elaborate temperature controls. Generally, such individual sources are cumbersome, difficult to adjust, require considerable time to change and stabilize at different temperatures. They are inherently inaccurate in combined usage since their settings are not interrelated but depend on the accuracies of their individual controls to maintain desired infrared radiation differentials.

To find the limits, that is the resolution of the device being tested, test sources can be placed at various distances from each other closer and closer together until a spacing is found at which the sources no longer appear separated, when viewed from a distance, and/or various combinations of test source positions and radiation intensities can be used. A difficulty of doing this with groupings of separate individual test sources is quite apparent in view of the natural energy transfer between test sources at different temperatures with heat energy flow from a hot body to a cooler body.

Further, it is desirous from time to time to check the device under test throughout its full field of view. This is generally done by traversing the device under test in relation to the test sources such that the test source patten is made to appear in various portions of the device's field of view. With transfers of heat energy between test sources, and to the ambient, test patterns are generally subject to some change within the time required to make desired checks.

It is, therefore, a principal object of this invention to provide long wavelength infrared test sets useful as test sources, or targets, facilitating convenient and accurate testing, calibration, evaluation or other analyses of infrared radiation detecting devices.

Another object is to simultaneously provide test source patterns generally distributed to fill the full optics aperture and field of view of the device being tested.

A further object is to provide test source patterns arranged to simulate groupings of test sources of known graduated sizes and intensities of infrared radiation.

Another object is to maintain test source pattern infrared radiation intensities at set levels without any substantial variation for extended periods of time.

Still another object is to provide test source patterns closely simulating conditions a unit being tested is likely to encounter in real use.

A further object is to provide test source patterns that can simulate limit conditions to quickly determine if the unit being tested is good enough for real use, for example, a "go no-go" test pattern.

Features of this invention useful in accomplishing the above objects include, in an infrared radiation sensing device test set, an optical system that projects onto the field of view and intercepts the full aperture of the device being tested the infrared radiation from two plates at temperatures with a controlled difference. This is with a first plate containing openings in chosen patterns through which radiations from portions of the second plate are viewed simultaneously with radiation of the first plate. This presents infrared radiation test source points with a temperature difference from the first plate, as a background, at the difference in temperature between the two plates, and with the position and size of the test source points substantially coincident with the position and size of the openings in the first plate. By using various test plates having various opening patterns, as the first plate, and by varying and controlling the temperature difference between the two plates in conjunction with the test set optical system that projects radiation from the plates into the field of view of the device being tested, infrared radiation test source patterns can be easily created for checking various criteria of infrared radiation sensing devices. For example, if the first plate contains different set of opening patterns such as uniformly sized openings with various separations, and/or patterns with uniformly separated openings of various sizes, or combinations of variations of both hole spacings and sizes, and/or groups of tapered slots, a total test pattern may be easily developed for checking the full optics aperture field of view while intercepting the full optical aperture of an infrared sensing device being tested. Actually the test patterns developed may be much like conventional television test patterns and used for some comparable purposes as test patterns are used in adjusting and testing television sets.

Figure 5:
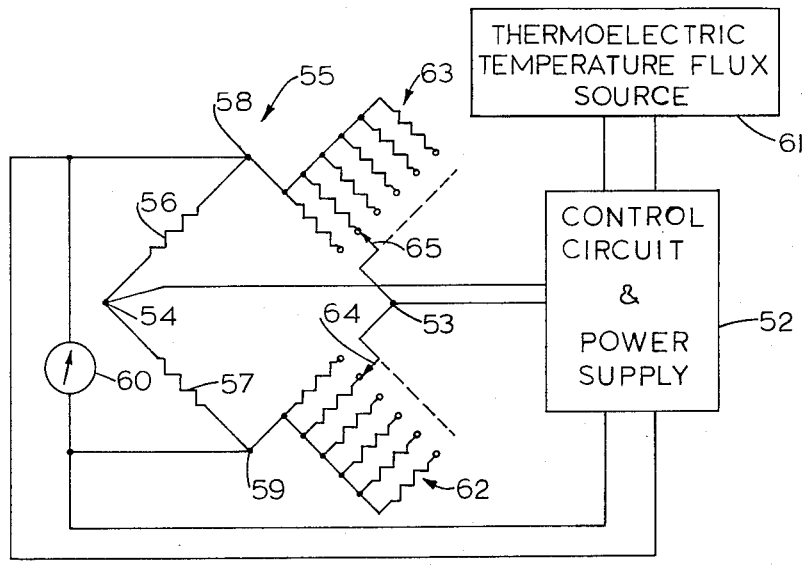
Figure 6:
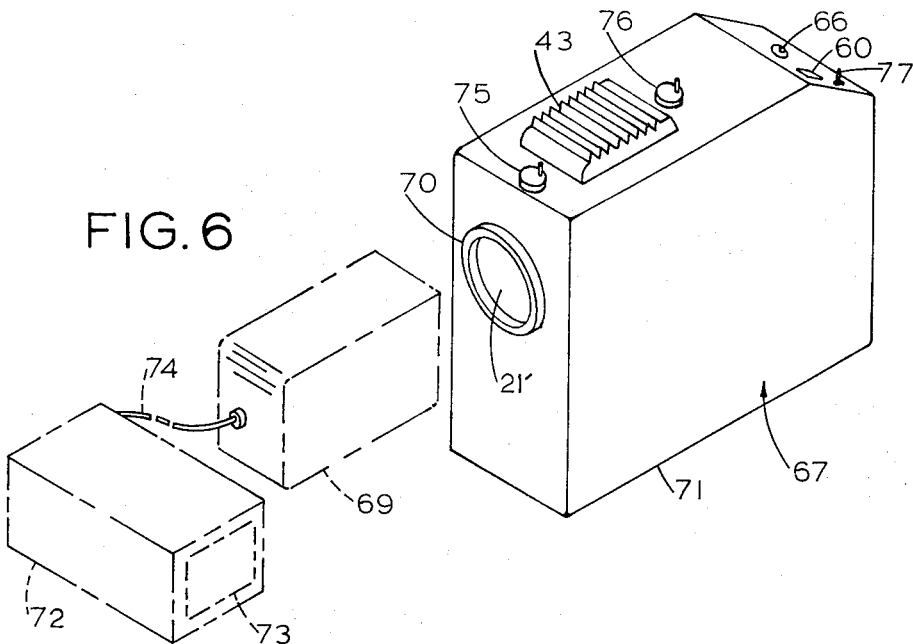
Figure 7:
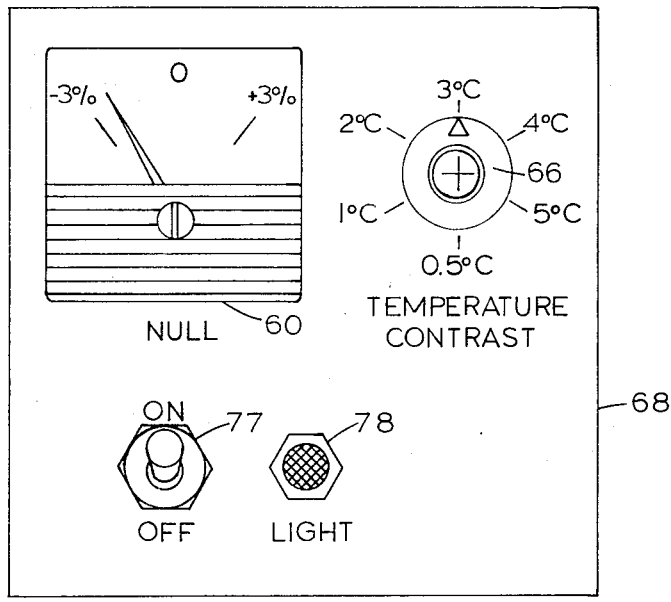
Figure 8:
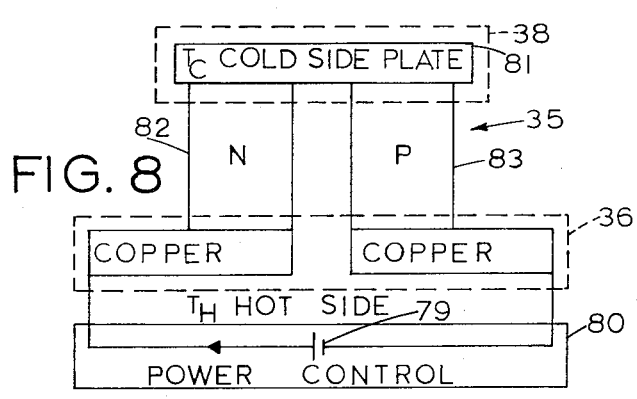
Figure 9:
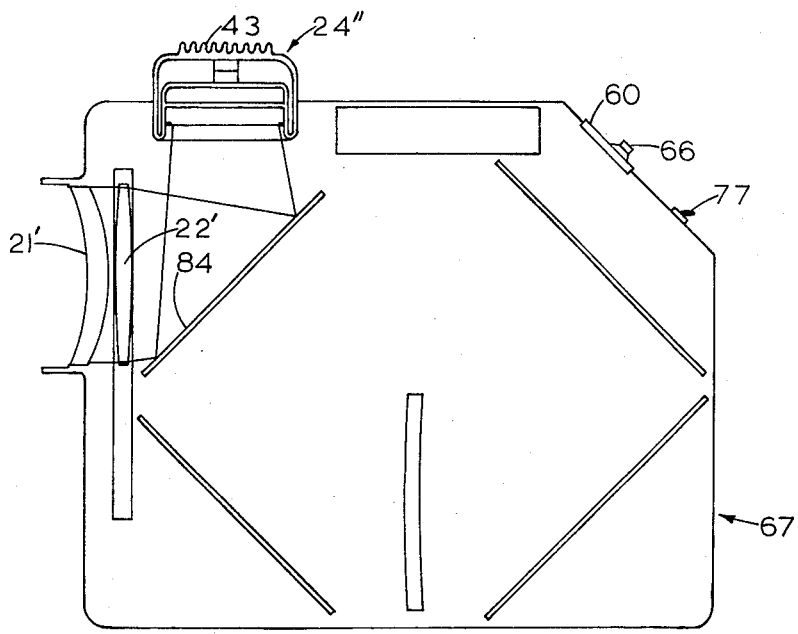
Figure 10:
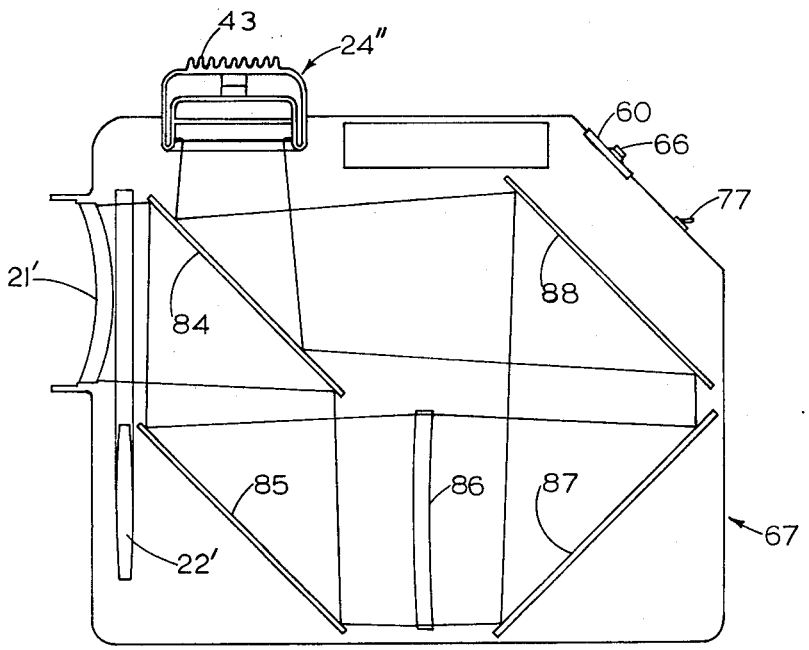

Specific embodiments representing what are presently regarded as the best modes for carrying out the invention are illustrated in the accompanying drawings:

In the drawings:

FIG. 1 represents a cut away and sectioned side elevation view of a long wavelength infrared test set in accord with applicant's teachings with a simple straight two lens optics system projecting emissions from a graybody (near blackbody) plate spaced behind a test pattern and passed through openings in the test pattern;

FIG. 2, a partially cut away and sectioned view of another test set embodiment with the graybody plate and test pattern supported in a heat flow conductive metal housing folded back on itself, and including a rotatable transparent disc with modulation patterns printed thereon;

FIG. 3, a front view of the rotatable transparent disc of FIG. 2 taken from line 3—3 of FIG. 2;

FIG. 4, a typical test pattern used in any of the infrared test set embodiments;

FIG. 5, a schematic block diagram of a temperature sensing and control circuit used with one or more of the embodiments in any of various modifications thereof that would be apparent to those skilled in the art;

FIG. 6, a perspective view of a test set with an infrared system indicated in phantom in position for testing and calibration;

FIG. 7, an instrument and control panel that may be used with the various test set embodiments;

FIG. 8, a diagramatic showing of a thermoelectric junction unit that may be employed with the embodiments of FIGS. 2, 6, 9 and 10;

FIG. 9, a cut away side elevation partial view of a test set such as shown in FIG. 6 with the optical system in the wide field of view configuration; and FIG. 10, a cut away view of the same test set of FIG. 9 with the optical system in the narrow field of view configuration.

Referring to the drawings:

The long wavelength infrared test set 20 of FIG. 1 includes a simple straight two lens optics system with a meniscus 21 and a lens 22 mounted within a closed optical cavity within tube 23. The optical cavity is closed to minimize variance in calibration due to thermal variations and the collection of moisture and dust that is particularly a problem with open optical cavities. Adjustments may be made in focal adjustment for simulation of various target ranges and changing fields of view by shifting lens 22 between the position indicated in phantom and the position shown. While the tube 23 is circular in cross section, just as with tube 23' of the FIG. 2 embodiment 20' that appears in cross section in FIG. 3, with a circular meniscus 21 and lens 22, the tube 23 and lens units may be rectangular. In any event the tubular, or rectangular, enclosure 23 extends beyond lens 22 back to and encloses an infrared target assembly 24 including a blackbody plate 25 mounted approximately one inch behind a test pattern plate 26 (or test sheet) a typical sample of which is shown in FIG. 4. The blackbody plate 25, that may be considered by some a graybody (near blackbody) plate, and the test pattern plate 26 are mounted in an elongate metal cylinder 27 (or of rectangular channel shape) of a highly thermally conductive metal such as aluminum or copper with moderately thick walls for desired heat conductive flow. Thus, with temperature difference heat flow established longitudinally through the metal cylinder 27 a temperature difference $\Delta T_1$ is established in the one inch (or other discreet spacing) spacing between the blackbody plate 25 and the test pattern plate 26 with the temperature of the plate locations transmitted generally to and through the respective plates 25 and 26. Then if a temperature gradient $\Delta T_2$ is established through metal cylinder 27 from one end to the other and the cylinder 27 is 10 times in length the spacing of plates 15 and 26 (ten inch cylinder 27 length to one inch plate 25 and 26 effective spacing) then $\Delta T_1$ is equal to $\Delta T_2$ divided by ten.

A heater 28 is positioned at one end of metal cylinder 27 and thermoelectric cooler 29 is positioned at the other end of the metal cylinder 27 with both the heater 28 and cooler 29 in close intimate temperature transfer contact with the respective ends of the cylinder 27. The cylinder 27 is supported by a jacket of insulation 30 throughout the cylinder length within tube 23. Obviously, heating power applied to heater 28 and heat removal by cooler 29 must be controlled functions in attaining target radiation calibrations desired. Further, it should be realized that the cooler and heater 28 could be reversed in some embodiments in order that blackbody plate 25 be cooler than test pattern plate 26 rather than the reverse if desired. In other embodiments either a heater or cooler could be used alone at the outer end with a temperature transfer to ambient system in place of thermoelectric cooler 29 at the inner end of cylinder 27.

With the embodiment of FIG. 1 $\Delta T_2$ temperature control to $\pm 0.1°$ C results in 0.01°C control of the $\Delta T_1$ temperature difference. Some test units would have to be capable of pumping up to 50 watts load for maintaining a $\Delta T_1$ of 3° C when $\Delta T_2$ is slightly above 30° C. AS an infrared radiation sensing device test set the optical system projects onto the field of view, and intercepts the full aperture of the device being tested, infrared radiation from the two plates 25 and 26 at temperatures with a controlled difference. This is with the test pattern plate 26 (a plate or sheet approximately ½ to 1 mill thick) containing openings in chosen patterns through which radiations from portions of the blackbody plate 25 are viewed simultaneously with radiation of the test pattern plate 26. This presents infrared radiation test source points with a temperature difference from the test pattern plate 26, as a background, at the difference in temperature between the two plates, and with the position and size of the test source points substantially coincident with the position and size of the openings in the test pattern plate.

The test pattern of FIG. 4 is typical of a pattern that may be employed for test pattern plate 26. Obviously, a considerable range of test patterns could be used, even a chart similar to the T V type RETMA chart as modified to reflect measurement unique to an infrared system could be used. With the pattern shown for plate 26 the regions "A" are an open area for radiation to come from the source with the pattern a thin plate of blackened metal (that is blackened on the optics side and shiny on the plate 25 side) with the test pattern etched through the plate. The regions "J" of the horizontal and vertical ten scale gray scale charts are etched such that 10 percent of the radiation comes through the test pattern. This is accomplished by etching small holes (0.001 to 0.003 inches in diameter or in some instances semi-elliptical small holes or other shapes) in a pattern (that could be random in some instances) such that an area the size of the instantaneous field of view of a single detector as projected on the test pattern will be large (0.010 to 0.030 inches) with respect to the individual holes. This allows only 10 percent of the radiation difference between the plates to come from the regions "J" as come from regions "A". In the same manner the region "B" will have 90 percent holes with 10 percent metal at the test pattern plate 26 temperature and will allow 90 percent of the radiation to come from the blackbody plate 25. This is carried out in specific graduations in other regions to effectively produce both vertical and horizontal ten scale gray charts for testing the infrared system. A bar of width representing the instantaneous field of view of a detector (or limiting angular resolution of the system) has a graduated hole pattern etched through the bar area from a full open area at point "A" to 10 percent of the area open near point "B". This is useful in measuring the angular resolution versus the radiation level to give a modulation transfer function of the infrared system being tested. The four wedges of the pinwheel are also etched full open while the circles retain enough metal for structural support. While this description may be considered as directed to the test pattern being held at 300° K (Kelvin) and the blackbody source plate at 303° K the source plate 25 could also be varied for more test set range. Whichever the desired bias of $\Delta T_1$ thermocouple sensors 31 and 32 at opposite ends of metal cylinder 27 sense the $\Delta T_2$ opposite end temperatures in a temperature control system, not shown in detail for the embodiment of FIG. 1, that could have some features in common with the temperature sensing and control system of FIG. 5 that may be used with the embodiment of FIG. 2. Temperature sensors such as thermocouple sensors 33 and 34 shown in the FIG. 2 embodiment may also be employed in a FIG. 1 embodiment for obtaining a direct $\Delta T_1$ reading.

The test pattern plate has been described as being an etched metal plate although it could be a transparent base plate with the pattern deposited on one surface and the applicable temperature adjustment so made as to take into account the optical transmission at wavelengths of interest through the base plate material in addition to the optical transmission of the lenses in the test set. Further, surface conditioning material may be deposited on the back of the pattern to minimize small variations of temperature across the chart. Temperature control calibration may be such as attained by controls shown with some of the embodiments to present a patten with the apparent temperature reading on knobs and dials. This eliminates the need for calculating each dial setting for test set lens transmission and focal length ratios between the test set and an infrared system being checked.

The FIG. 2 embodiment is quite similar to the FIG. 1 embodiment, however, it employs an infrared target assembly 24' with a heat flow conductive metal (aluminum or copper or other high heat flow material) housing 27' folded back on itself in place of a straight elongate metal cylinder such as cylinder 27 used with the embodiment of FIG. 1. Where components are the same between embodiments the same numbers are used and where there are similarities between components or their function primed numbers may be used as a matter of convenience. The basic optics system for the FIG. 2 embodiment may be concluded to be the same as with the FIG. 1 embodiment and is not shown again. The folded-back-on-itself housing 27' lends itself very conveniently to the use of a combination thermoelectric heater-coder unit 35 with a hot section 36 in contact with the inner hot end wall 37 of the housing 27' and a cold section 38 in temperature transfer contact with the outer cold end wall 39 of the housing 27'. Housing 27' at moderate spacing from the inner hot end wall 37 forward through an inner cylinder (or rectangular) section 40 supports plates 25 and 26 with the $\Delta T_1$ developing spacing, just as with cylinder 27 of the embodiment of FIG. 1, and extends to the forward turned end 41. This gives high temperature flux metal conductive circuit continuity required in housing 27' to and through outer cylinder section 42 extended to the rear therefrom to complete the temperature heat flux metal circuit, having relatively thick circuit walls, in outer cold end wall 39. While the heat flux metal circuit of housing 27' is closed on itself from hot wall 37 to cold wall 39, that may be equipped with external cooling fins 43 shown in the embodiment of FIG. 6 for such a folded back on itself housing, the walls 37 and 39 and the cylinders 40 and 42 are in mutually spaced relation, respectively.

The optics system for the embodiment of FIG. 2 is not shown since it could be the same as with the embodiment of FIG. 1 or any of many optics systems that may be tailored to meet specific desired needs as would be apparent to those skilled in the art. In any event the optical system used to project a target test pattern for testing of various forward looking infrared systems should exhibit most of the characteristics of the system under test. It is highly desirable that the aperture, field-of-view, and transmitted spectrum be similar. Nominally the focal length of the test set optics is three to four times the focal length of the infrared system optics subject to test. This is with a typical infrared system having, for example, a viewing lens with diameter of 7 inches and a f/no. between 1.5 and 2.2. The optics system of a typical infrared system would normally fall in the range of two to four refractive elements with the test set possibly having the same number but not necessarily so. A two element lens system such as shown with the embodiment of FIG. 1 may be used if it is not important to have a relatively short small size test set. One reflective element in combination with a Schmidt corrector would be a good selection with some test sets. This would be with the one reflective element coated for wide band transmissions as would be attractive with respect to reflections from the refractive lens surfaces. Two reasons for this being important are calibration of the test set and reflection of the cold spike in the infrared system. The latter problem is particularly significant with lens systems of some infrared systems being such that a reflection of the cold portion of the detector cooler back into the system could result in a very large false signal. This problem may be minimized by selection of lens radius of curvature and/or through use of as few lens elements as possible in a test set.

The purpose of the optical system in a test set is to simulate a full field test target in the ranges of 1,000 feet to infinity for forward looking infrared systems. This is with target patterns, such as the pattern of FIG. 4, employing small hole patterns (only partially shown with holes and then simulated with variations in lines representing different shading sections through the ten scale pattern sections) producing diffraction effects and vignetting effects. This is with diffraction effects for small holes down as small as 0.001 inch diameter being quite large. For example, the Raleigh diffraction angle for a 0.001 inch diameter aperature $\Delta\theta = 0.48$ radian. However, since the diffraction effects occur in the image plane they do not have a major effect on the system resolution. Further, is a system is used where plate 25 is cooler than pattern plate 26 and plate 25, as a cold radiation source behind the hole pattern, is assumed to be a uniform Lambertian radiator, the fact that some radiation is diffracted out of the receiving cone of the optical system is of no major concern, since it is replaced by energy diffracted from other portions of the cold source. With respect to the vignetting effect this is pronounced due to the finite thickness of the target plate (or sheet). Since the smallest holes are 0.001 inch in diameter and the target sheet is approximately ½ to 1 mil thick the transmission of the holes varies appreciably with optics system incident angle.

Referring also to FIG. 3 a rotatable circular transparent disc 43 with opaque blackbody patterns printed thereon is rotatably mounted by three grooved mount wheels, a drive wheel 44 and two idler wheels 45 and 46. Drive wheel 44 is driven as desired by a motor 47 mounted via pedestal 48 extended through insulator sleeve 30' from cylinder 23', and the idler wheels 45 and 46 are rotatably mounted on pedestals 49 and 50 also extended through insulator sleeve 30' from cylinder 23'. This rotatable circular transparent disc 43 while not on the apparent image plane of plate 26 is sufficiently close to give a motion modulation test effect simulation of object motion close to the image plane over a simulated background. Such object movement simulation could be positioned closer to the forward looking infrared equipment being tested than as shown in FIGS. 2 and 3 to test the effect of object movement through the field of view much closer to the equipment than a simulated target background being viewed. A rotatable test pattern in a further embodiment could replace the test plate 26 for additional equipment test target simulation as desired although this approach is not shown in detail. Please note that at least one radiation heater 51 is provided for heat input to the blackbody patterns on disc 43 by controlled radiation as needed. This is with such heat radiation for patterns on disc 43 so mounted within cylinder 23' with heat radiation so directed as to not impart heat to test pattern plate 26. Obviously, this additional disc 43 feature may be included with other embodiments or not or perhaps not included at all with the embodiment of FIG. 2 is desired.

Various elements may be employed for sensing temperature as sensors 31 and 32, 31', 32', 33 and 34 in the embodiments of FIGS. 1 and 2 and other embodiments with the temperature sensors being, for example, thermocouples, thermistors or resistance thermometer bulbs. The temperature sensing and control circuit of FIG. 5 shows a circuit in simplified form that could be adapted for use with various test set embodiments. The control circuit and power supply 52 applies dc power across terminals 53 and 54 of Wheatstone bridge circuit 55 with resistors 56 and 57 being thermistor resistances used as sensors 31 and 32 or 31' and 32' in the FIGS. 1 and 2 embodiments. Thermistor resistances 56 and 57 extend to bridge terminals 58 and 59 respectively across which null reading indicator 60 is connected. Terminals 58 and 59 are also connected back as sensed $\Delta T_2$ opposite end readings to control circuit 52 for attaining calibrated output control to thermoelectric temperature flux source 61. Please note that the resistance branch of the bridge 55 opposite thermistor resistance 56 and the branch opposite thermistor resistance 57 are multi-resistance branches 62 and 63 respectively that are set to different bridge balancing calibration values by movement of contact switches 64 and 65, respectively. Switch 64 and/or 65 and balance of bridge 55 are subject to being switched and balance temperature contrast calibration controlled through setting of, for example, a temperature contrast knob 66 such as used on the test set 67 of FIG. 6 and shown on instrument and control panel 68 in detail in FIG. 7. Thus, through measurement of the larger $\Delta T_2$ and control of thermoelectric temperature flux source units (such as 28 and 29 in FIG. 1 and combination thermoelectric heater-cooler unit 35 in FIG. 2) such as the thermoelectric junction unit 35 shown in FIG. 8 closely controlled attainment of $\Delta T_2$ and thereby $\Delta T_1$ to various switch selected calibrated graduations is attained. This is accomplished through knob 66 control and observation of null instrument 60 that gives an indication when the measurement is within 3 percent of the desired value down to extremely close values at null.

Referring now to the perspective view of FIG. 6 a forward looking infrared system unit 69 subject to test, shown in phantom, is in position looking into the test set 67 outward viewing circular meniscus lens 21'. Actually the infrared system unit 69 could be placed much closer to the meniscus lens 21' and the mounting annular shield 70 portion of the test set housing 71 that, in this particular embodiment, is generally a rectangular housing. The infrared system unit 69 is provided with a TV type screen viewing unit 72, with a viewing screen 73, that is connected to the forward looking infrared system unit 69 by signal wiring 74 interconnect for video type viewing of the scene sensed by the unit 69. The test set is equipped with a temperature control knob 66 having six positions 0.5° C, 1.0° C, 2.0° C, 3.0° C, 4.0° C and 5.0° C for setting the target temperature $\Delta T_1$ as shown in FIG. 7. The null meter 60 indicates when the target has reached the set temperature. A focus control knob 75 is located on the top of test set housing 71 to set the equilavent range of the target from 1,000 feet to infinity. Further, the rotating crank knob 76 is used in positioning the system lenses and mirrors to either the test wide field of view of the narrow field of view as shown in FIGS. 9 and 10 respectively. An On-Off switch 77 along with an On indicating light 78 are also included on control panel 68 of test set 67.

The combination thermoelectric heater-cooler unit 35 of FIG. 8 with hot section 36 and cold section 38 in a single thermoelectric junction consisting of a negatively doped leg (N-type) of Bismuth Telluride and a positively doped leg (P-type). As a dc current, as indicated by dc from a simulated battery 79 in power control 80, passes through the N-type and P-type semiconductor materials, the electrons go from a low energy state in the P-type material, through an intermediate energy level in the copper plate 81 bridging the N-type section 82 and the P-type section 83, to a high energy level in the N-type material of section 82. Energy is added to the electrons during this transition by absorbing energy from the surroundings to, in effect, lower the temperature of copper plate 81 below ambient temperature. The hat absorbed in transmitted through the leg sections 82 and 83 by electron transport to the hot section 36 and liberated. Some thermoelectric units may interchange hot and cold ends by reversing the dc imposed on the unit for reversing the relative heating and/or cooling of the spaced plates 25 and 26 or their equilavent in various test set embodiments.

Referring again to the forward looking infrared system test set 67 of FIG. 6 the test set has two optical system arrangements to provide a wide 23°× 30° field of view with the arrangement of FIG. 9 and a narrow 5.7°× 7.6° field of view with the arrangement of FIG. 10. With the wide field of view arrangement of FIG. 9 the optics system has first the outward circular meniscus lens 21' and then lens 22' that may be shifted back and forth for simulated range adjustment to some degree (shifting mechanism detail not shown). Next is a mirror 84 that is canted at such an angle (approximately 45 from the vertical in FIG. 9) as to reflect incident radiations up to target assembly 24'' and downwardly directed return long wavelength radiations emanating from the target assembly 24'' generally horizontally back out through optics lens 22' and 21' to a forward looking infrared system subject to test. This is with the infrared target assembly 24'' very much the same as target assembly 24' shown and described in conjunction with the FIG. 2 test set embodiment.

In making the transition from the test set 67 arrangement of FIG. 9 to the narrow field of view arrangement of FIG. 10 the crank knob 76 is turned to pivot two sided mirror 84 through substantially 90° counterclockwise while also moving lens 22' down and out of the optical path. This provides for an optical path inwardly through meniscus lens 21' to mirror 84 reflected downward to mirror 85 then reflected through lens 86 to mirror 87. The optical path is reflected upward from mirror 87 to mirror 88 and then back horizontally to the back reflective surface of double sided mirror 84 and reflected therefrom to the infrared target assembly 24''. Obviously, infrared radiations emanating from the target assembly 24'' are passed through the optics combination mirror and lens system to and through miniscus lens 21' to any forward looking infrared system being tested. It is of interest to note that with the target assembly 24'' at the top of test set housing 71 and with the target assembly 24'' heated to higher temperature than ambient within the housing, since heated air rises, convection air flow temperature distortion is minimized.

With respect to collection and display of infrared sensed information a flying spot scanner may be used to scan an infrared scene. For example, a flying spot scanner will scan a scene 1000 feet away from the scanner in the form of a rectangular area. If the scanner, as a forward looking long wavelength infrared sensor, has a 30° × 40° field of view the instantaneous scanning spot is one millirasian or one foot in diameter with the object plane size being 525 feet by 700 feet. The TV type display, such as shown in FIG. 6, would having a flying spot of 0.015 inches diameter with thereby the scene being reduced by a factor equal to 12 inches divided by 0.015 inches, a reduction of 800 times. This is with the scene reproduced by intensity modulating the display spot as it is swept across the display tube face much the same as with black and white TV. The number of shades of grey vary from display to display with some 6 to 10 shades being produced on a good display.

With reference again to the test pattern chart of FIG. 4 rather than having the scales vary from complete 100 percent metal removal to 10 percent other scale ranges may be used. For example regions A of the chart may have a number of small diameter holes etched through the plate such that 50 percent of the area is open so that contrast produced between regions A and the areas of the pattern chart plate 26 with no metal removed is equilavent to the contrast of two targets having a 1° C temperature difference when $\Delta T_1$ is equal to 2° C. Region B is etched such that 45 percent of the area is open to thereby produce a contrast of 0.9° C relative to region A. The regions from regions A to regions J are etched to give 10 contrast levels or grey scales by 5 percent etched metal steps, and with the length to width ratio of each 5 percent area being a predetermined ratio for a particular system. This arrangement allows measurement of angular resolutions versus radiation level to give a modulation transfer function of the infrared system.

Defining a noise equilavent power (NEP) as the power necessary to produce a signal equal to the noise it follows, that noise equilavent temperature (NET) may also be defined as the $\Delta T$ necessary to produce a signal equal to the noise.

Thus the power of a detector is given by:

$$\Delta P = \epsilon \sigma T^3 \Delta A_o (\Delta \theta)^2$$

with : $\epsilon$ = emissivity
$\sigma$ = Stephen Boltzmann constant
$T$ = Absolute temperature
$A_o$ = Area of the collecting optics
$\Delta \theta$ = instantaneous scanning beam
and $$D^* = \frac{S/N \sqrt{A_d} \sqrt{BW}}{NEP}$$

with: $S/N$ = Signal to noise ratio
$A_d$ = Area of the detector
BW = Bandwidth of the video channel
NEP = noise equilavent power = $\Delta P$
substituting $\Delta P$ $$D^* = \frac{S/N \sqrt{A_d} \sqrt{BW}}{\epsilon \sigma T^3 \Delta T A_o (\Delta \theta)^2}$$

and $$\Delta T = NET = \frac{S/N \sqrt{A_d} \sqrt{BW}}{\epsilon \sigma T^3 D^* A_o (\Delta \theta)^2}$$

Assume selection detectivity $D^*$ of the detector, area of the collecting optic, bandwidth and instantaneous field of view such that with a scene viewed having an average temperature of 300°Kelvin the NET is equal to 0.1° K. Then scene targets scanned 0.2° K warmer than the background appear one grey scale brighter than the adjacent target background and a 0.3° K target appears two grey scales brighter. Obviously, with targets cooler rather than warmer than background contrast detectability is much the same.

With, in the different test set embodiments, target to target or to background temperature contrasts being important the effect of various optical systems on detecting temperature contrasts must be considered. For example, with an optical system containing both reflective and refractive elements in a 0.25 milliradian mode the optical path includes two lenses and one mirror (FIG. 9). With a wavelength range of 8μM to 14μm the transmission of a coated germanium lens in 85 percent while the reflectivity of a typical front surface mirror is 95 percent, and the total transmission of the optics for the 1.0 milliradian mode, $\Psi$ 1.0, is given by:

$$\Psi_{1.0} = (0.85)^2 (0.95) = 0.685$$ while the transmission for the 0.25 milliradian five mirror (FIG. 10) mode is given by:

$$\Psi_{0.25} = (0.85)^2 (0.95)^5 = 0.56$$

It should be noted that the mirrors also have 5 percent emissivity and radiate infrared energy at the temperature of the test housing, while the lenses, being transparent, have very low emissivity. However, the lens 85 percent transmission requires 15 percent reflection of target signal that is absorbed on the inside black walls of the test set housing. Conversely, radiation at ambient temperature is reflected by the lens into the optical path with the net effect of both lenses and mirrors being to attenuate target signal and replacing some portion thereof with black body radiation at substantially test set housing internal temperature. Thus all $\Delta T$ values presented to a system subject to test are given by the product of target $\Delta T$ values and optic system transmission. The attenuation effect applies equally to thermal imperfections such as temperature sag in the target and the intentional thermal signals and percentage errors in $\Delta T$ as calculated hereinbefore apply both to actual target $\Delta T$ as well as the $\Delta T$ value presented to the system under test.

Whereas this invention is herein illustrated and described with respect to several embodiments thereof, it should be realized that various changes may be made without departing from the essential contributions to the art made by the teachings hereof.

I claim:

1. In a test set for forward looking long wavelength infrared systems: target means simulating a scanned scene; optics system means positioned and adjusted to project onto the field of an infrared system, positioned for testing by the test set, the scene generated by said target means; said target means including a first plate and a second plate supported in spaced apart relation; temperature flux means connected to said first and second plates in temperature transferring contact therewith; and said first plate being equipped with portions essentially transparent to long wavelength infrared radiation from the second plate and with said portions in chosen patterns on said first plate.

2. The test set of claim 1, wherein said first plate is a relatively thin sheet of heat transfer characteristic material; with said portions essentially transparent to infrared radiation being relatively small holes through said first plate positioned in large areas, relative to hole size, by predetermined patterns and in different percentage open areas for different pattern areas of the plate to provide different grey scales.

3. The test set of claim 2, wherein said first plate is substantially at the image plane of said optics system.

4. The test set of claim 3, wherein said predetermined patterns include a plurality of side by side sections with said relatively small holes providing different percentage open areas by substantially equal percentage steps between pre-chosen maximum and minimum percentage open areas providing a substantially equal step grey scale between limits.

5. The test set of claim 2, wherein said temperature flux means connected to said first and said second plates has a temperature flux sustaining said first plate at a higher temperature than said second plate.

6. The test set of claim 2, wherein said temperature flux means connected to said first and said second plates has a temperature flux sustaining said first plate at a lower temperature than said second plate.

7. The test set of claim 1, wherein said temperature flux means includes a high temperature flux material circuit of greater length than the spacing of said first and second plates; and with said first and second plates mounted in predetermined spaced relation interim the length of said high temperature flux material circuit.

8. The test set of claim 7, wherein said target means includes at least one energy exchange device in effective temperature flux transfer contact with said high temperature flux material circuit.

9. The test set of claim 8, wherein said energy exchange device is a heater.

10. The test set of claim 8, wherein said energy exchange device is a cooler.

11. The test set of claim 8, wherein there are first and second energy exchange devices in effective temperature flux transfer contact with said high temperature flux material circuit at greater spacing than said first and second plates.

12. The test set of claim 11, wherein said first and second energy exchange devices are different temperature level devices; and control means for at least one of said first and second energy exchange devices for establishing a predetermined heat flow flux through said high temperature flux material circuit.

13. The test set of claim 12, wherein at least two heat sensors are in effective temperature sensing contact at longitudinally spaced apart locations of said high temperature flux material circuit, and with said heat sensors part of said control means.

14. The test set of claim 13 wherein said high temperature flux material circuit is in the form of a folded back over itself circuit with, an inner channel section mounting said first and second plates, and an outer section with walls in spaced enclosing relation to said inner channel section.

15. The test set of claim 14, wherein said first and second energy exchange devices are in the form of the hot and cold sections respectively of a combination thermoelectric heater-cooler.

16. The test set of claim 13, wherein the optics system is a straight lens system.

17. The test set of claim 13, wherein the optics system is a folded optics system including both lens and mirror means.

18. The test set of claim 17, wherein the test set includes a housing with said target means mounted in the top of said housing and facing downward to the interior of said housing.

19. The test set of claim 18, wherein the test set includes lens and mirror adjustment means for changing target effective simulated fields of view.

20. The test set of claim 18, wherein said first and second plates in said target means are heated to higher than ambient temperatures during use.

21. The test set of claim 2, wherein said first plate is moveable relative to said second plate.

22. The test set of claim 2, wherein moveable image means is located between said first plate and optics of the test set.

23. The test set of claim 1, wherein the surface of said second plate facing said first plate is a near blackbody surface.

24. The test set of claim 23, wherein the surface of said first plate facing said second plate is shiny; and the optics side of said first plate is blackened.

* * * * *

UNITED STATES PATENT OFFICE
CERTIFICATE OF CORRECTION

Patent No. 3,694,654   Dated Sept. 26, 1972

Inventor(s)  James D. Crownover

It is certified that error appears in the above-identified patent and that said Letters Patent are hereby corrected as shown below:

Column 1, line 7, change "of" to --or--.

Column 2, line 63, change "set" to --sets--.

Column 4, line 20, change "15" to --25--.

Column 4, line 48, change "AS" to --As--.

Column 6, line 18, change "coder" to --cooler--.

Column 7, line 23, change "is a" to --if a --

Column 9, line 22, change "hat absorbed in" to --heat absorbed is--.

Column 10, line 51, change "of" to --on--.

Signed and sealed this 20th day of November 1973.

(SEAL)
Attest:

EDWARD M. FLETCHER, JR.       RENE D. TEGTMEYER
Attesting Officer              Acting Commissioner of Patents